US011492091B2

(12) United States Patent
Gaziotis et al.

(10) Patent No.: US 11,492,091 B2
(45) Date of Patent: Nov. 8, 2022

(54) METHOD FOR VESSEL TRACKING

(71) Applicant: MARITECH DEVELOPMENT LIMITED, London (GB)

(72) Inventors: Michail Gaziotis, London (GB); Eliad Perpinyal, London (GB); Richard White, London (GB); Miguel Angel Cabra, London (GB)

(73) Assignee: Maritech Development Limited, London (GB)

( * ) Notice: Subject to any disclaimer, the term of this patent is extended or adjusted under 35 U.S.C. 154(b) by 381 days.

(21) Appl. No.: 16/562,397

(22) Filed: Sep. 5, 2019

(65) Prior Publication Data

US 2020/0079486 A1 Mar. 12, 2020

(30) Foreign Application Priority Data

Sep. 6, 2018 (GB) ...................................... 1814546

(51) Int. Cl.
*B63J 99/00* (2009.01)
*G01S 19/48* (2010.01)
(Continued)

(52) U.S. Cl.
CPC ............ *B63J 99/00* (2013.01); *G01C 21/203* (2013.01); *G01S 19/48* (2013.01); *G01S 19/51* (2013.01); *G07C 5/008* (2013.01); *B63B 79/00* (2020.01)

(58) Field of Classification Search
CPC ........ B63J 99/00; G01C 21/203; G01S 19/48; G01S 19/51; G01S 5/0027; G01S 19/14;
(Continued)

(56) References Cited

U.S. PATENT DOCUMENTS

2015/0134559 A1* 5/2015 Murray .............. G06Q 10/0833
705/333
2016/0363671 A1 12/2016 Anderson et al.
(Continued)

FOREIGN PATENT DOCUMENTS

WO 2015127540 A1 9/2015

OTHER PUBLICATIONS

Extended European Search Report dated Feb. 14, 2020 in European Patent Application No. 1919604.8 3 (9 pages).
(Continued)

*Primary Examiner* — Yuen Wong
(74) *Attorney, Agent, or Firm* — Norton Rose Fulbright US LLP

(57) ABSTRACT

A computer-implemented method of tracking vessel movement which comprises receiving a first vessel data message comprising a first vessel identifier, the first vessel data message having been transmitted at a first time and being associated with a first position; and receiving a second vessel data message comprising a second vessel identifier, the second vessel data message having been transmitted at a second time and being associated with a second position. The method also comprises determining if the first vessel identifier and the second vessel identifier are related. If the first vessel identifier and the second vessel identifier are related, a speed required for a vessel to have moved from the first position to the second position is determined; which is then determined if the speed is below a speed threshold; and if the speed is below the speed threshold, the first position is associated with the second position.

17 Claims, 4 Drawing Sheets

(51) Int. Cl.
    *G01C 21/20*    (2006.01)
    *G07C 5/00*     (2006.01)
    *G01S 19/51*    (2010.01)
    *B63B 79/00*    (2020.01)

(58) Field of Classification Search
    CPC ......... G01S 19/42; G07C 5/008; B63B 79/00;
                                                G08G 3/00
    See application file for complete search history.

(56) References Cited

U.S. PATENT DOCUMENTS

2017/0043848 A1    2/2017    Rigdon et al.
    2017/0309189 A1    10/2017   Shedley et al.

OTHER PUBLICATIONS

UK-IPO, Combined Search Report and Examination Report under Sections 17 and 18(3) for related GB Application No. GB 1814546.6, dated Mar. 6, 2019, 9 pages.
Alvarez et al., "AIS event-based knowledge discovery for Maritime Situational Awareness—19th International Conference on Information Fusion," ISIF, 2016, pp. 1874-1880.
Horn, "Tear real time estimation of surveillance gaps—16th Intl Conf on Dependable, Automatic and Secure Computing, etc.—Proceedings of the 16th International Conference on Information Fusion," ISIF, 2013, pp. 1871-1877.
Kontopoulos, et. al., "Countering Real-Time Stream Poisoning: An Architecture for Detecting Vessel Spoofing in Streams of AIS Data—16th Intl. Conf. on Dependable, Autonomic and Secure Computing, etc." Aug. 12, 2018, IEEE, pp. 981-986.
Skauen, "Quantifying the tracking capability of space-based AIS systems," Elsevier, Advances in Space Research, 2015, pp. 527-542.

\* cited by examiner

METHOD FOR VESSEL TRACKING

CROSS-REFERENCE TO RELATED APPLICATION

The present application claims priority from Great Britain Patent Application No. 1814546.6, filed on Sep. 6, 2018, the entire content of which is incorporated herein by reference.

FIELD

The present disclosure relates to vessel tracking. More specifically, it relates to tracking movement of vessels in transit.

BACKGROUND

As sea-borne vessels travel around the world, they transmit position messages to indicate where they are. These position messages can be described as vessel data messages. This allows relevant personnel to know where a vessel is at a given time, for example to find out how far along a journey a vessel has travelled, or to avoid collisions. This is typically done using the Automatic Identification System (AIS). This is a communication protocol for radio transmissions that specifies the range of permissible frequencies as well the content of those transmissions. In the AIS, each vessel above a certain gross tonnage is required to be fitted with a tracking system that broadcasts information relating to the identity and characteristics of the vessel, as well as data relating to its current location and movement. Such data may include the location, orientation, course, and speed of the vessel. There are several types of message defined under that protocol, each with a different structure and different information.

The most frequently transmitted message by a factor of approximately 100 to 1, is a position report that contains, among other things, the vessel's Maritime Mobile Service Identity (MMSI), its longitude and its latitude. The MMSI is a unique nine-digit identification number that identifies the vessel transmitting the message. These messages are transmitted at a frequency of one every 6-10 seconds for vessels that are in transit and they work as an alert aimed at the recipients (which can also be vessels themselves) that a vessel is nearby, even if it is not visible due to environmental conditions.

The MMSI does not necessarily stay with a vessel for its whole lifetime. It is a temporary form of identification, variable through time (as is the vessel's name or owner). Each vessel also has a permanent identifier for the vessel, the International Maritime Organisation (IMO) number, which is typically given to the vessel at the time of the construction of its hull.

The MMSIs are issued by a national authority (ship registry) for each vessel that registers with them for taxation purposes. However, there is no global database that contains an up-to-date mapping of vessel IMO and MMSI numbers for all vessels for any moment in time. Each national authority has the IMO-MMSI pairs for a small part of the global merchant fleet and that information is not readily shared. Thus, when an AIS position report for a vessel is received that only contains a MMSI, other means are required to find which vessel (i.e. which IMO number) the position should be allocated to.

Further issues come from the fact that the MMSI that is being transmitted as part of an AIS message is manually input on the interface of an AIS transceiver onboard the vessel, which allows a vessel's MMSI to be changed easily. For example, since the action of changing the MMSI can be taken by anyone with access to the bridge of the vessel, without verification from any authority, many cases exist where MMSIs are input erroneously, and therefore AIS messages do not contain the correct identity. In some cases, a vessel owner or captain can change the MMSI intentionally, for example to hide the vessel's location. In terms of collision detection, that causes no issues because the vessel still transmits and allows neighbouring vessels to know that another vessel is there, but not which vessel. Furthermore, AIS transceivers need to be tested, like any other equipment on board a vessel, during its sea trials. When a vessel is new and has not yet been given a MMSI, the transceiver will be tested with any MMSI number value that the testing personnel are inspired to use. This could be a MMSI currently in use by another actively transmitting vessel and so two vessels could be transmitting with the same MMSI at the same time. This usually means that one or more incorrectly configured transceivers are causing "noise" and are polluting the list of transmissions received by a vessel which could be transmitting correctly. This can result in incorrect information being received for two or more vessels, rather than just one.

In addition to the scenarios described above, there is the case where the radio transmission could be distorted by a number of factors, such as overlapping radio frequencies with other transmissions from other types of transport such as taxis or airplanes. For these types of transport, it is evident upon inspection of their location (on land) that the transmissions should not be allocated to vessels, even if they appear to belong to one based on all provided identifiers.

A method for vessel tracking is required that mitigates at least some of these issues.

SUMMARY

Aspects of the present invention are set out in the independent claims. Optional features are set out in the dependent claims.

In accordance with an aspect of the disclosure there is provided a computer-implemented method of tracking vessel movement. The method comprises receiving a first vessel data message comprising a first vessel identifier, the first vessel data message having been transmitted at a first time and being associated with a first position; and receiving a second vessel data message comprising a second vessel identifier, the second vessel data message having been transmitted at a second time and being associated with a second position. The method further comprises determining if the first vessel identifier and the second vessel identifier are related. If the first vessel identifier and the second vessel identifier are related, a speed required for a vessel to have moved from the first position to the second position is determined, and it is also determined if the speed is below a speed threshold. If the speed is below the speed threshold, the first position is associated with the second position.

BRIEF DESCRIPTION OF THE DRAWINGS

Exemplary embodiments of the disclosure shall now be described with reference to the drawings in which.

Throughout the description and the drawings, like reference numerals refer to like parts.

SPECIFIC DESCRIPTION

Figure 1:
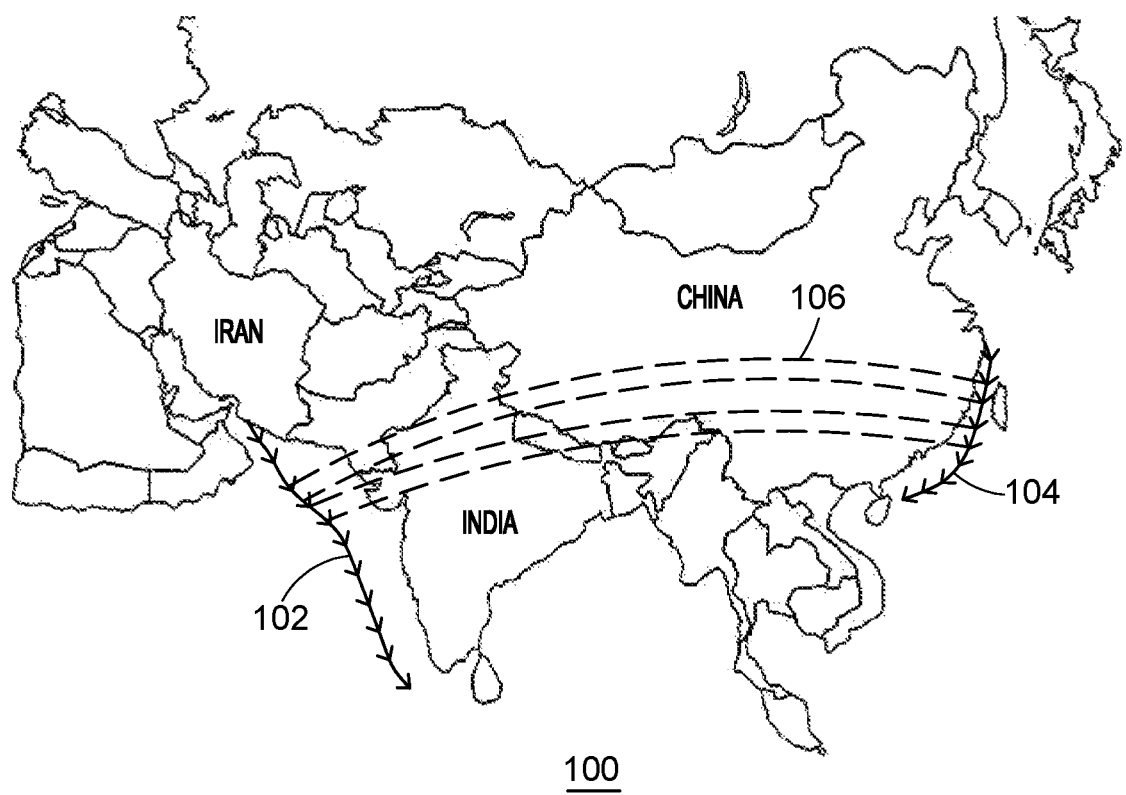
FIG. 1 shows a plot of the movement of two vessels.

FIG. 1 shows a plot 100 of the movement of two vessels. A first vessel track 102, running from Iran and along the west coast of India, depicts the movement of a first vessel. A second vessel track 104, running along the east coast of China, depicts the movement of a second vessel. In the instance that both vessels are transmitting the same MMSI, the tracks may be erroneously combined and it may appear as if a single vessel is jumping between positions that are a significant distance apart. This is indicated by potential vessel track 106, shown in dashed lines. This is clearly not the case, and so a method of processing such position data is required that accurately updates vessel positions and sorts them into the correct vessel tracks, such as the first and second vessel tracks 102, 104.

Figure 2:
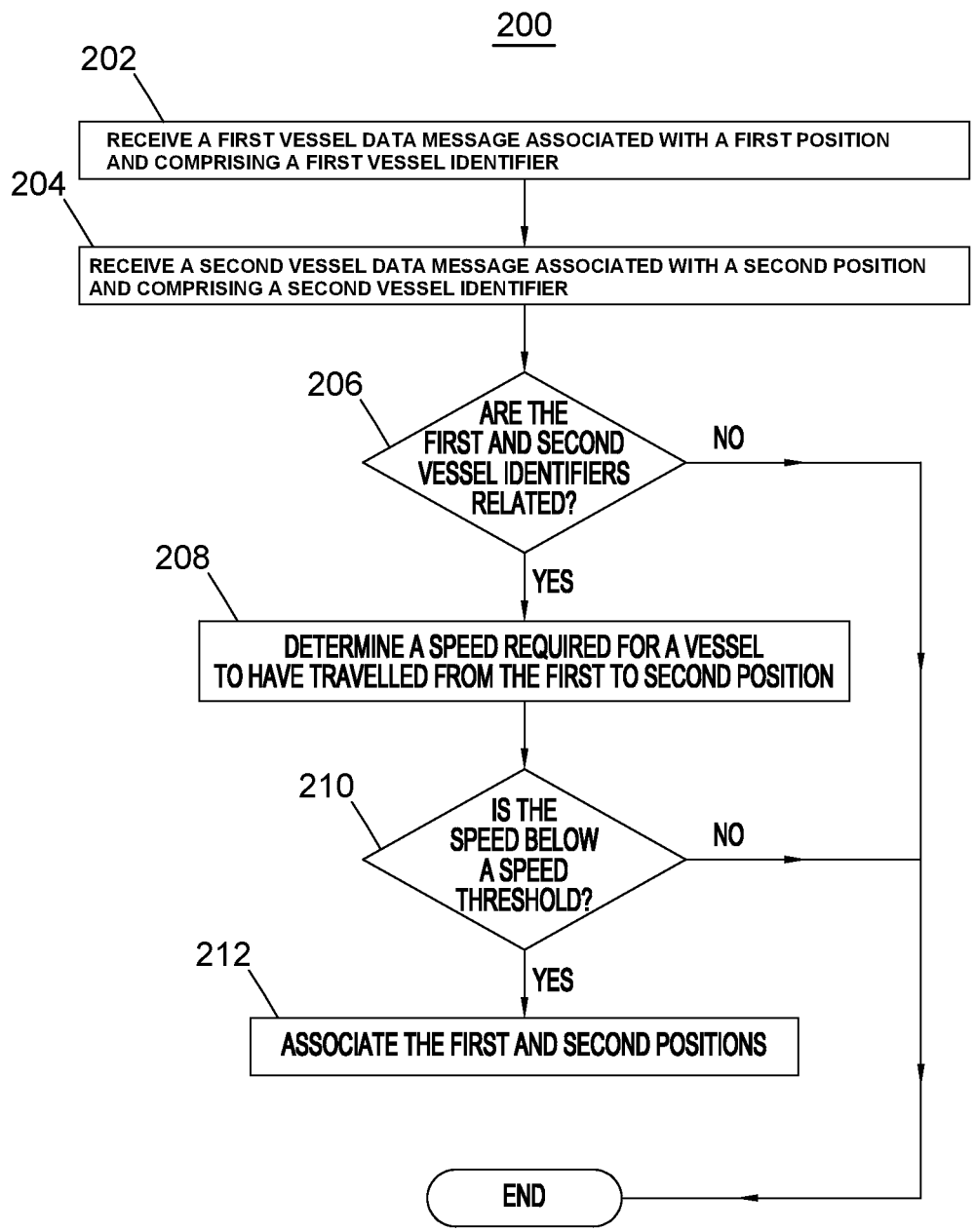
FIG. 2 shows a method of tracking vessel movement, according to embodiments of the disclosure.

FIG. 2 shows a method 200 of tracking vessel movement. The method may be implemented by a computing device, as will be discussed below.

The method starts at step 202, a first vessel data message is received. The first vessel data message comprises a first vessel identifier. The first vessel data message is associated with a first position. The first vessel data message is associated with a first time. For example, the message may comprise a timestamp. The time may be a time at which the message was transmitted, or may be the time at which the message was received by a receiver. At step 204, a second vessel data message is received. This message comprises a second vessel identifier and is associated with a second position and a second time in the same manner as the first message. The messages can be described as vessel traffic data. In other words, the vessel traffic data comprises a first vessel identifier transmitted at a first time and being associated with a first position, and a second vessel identifier transmitted at a second time and being associated with a second position and a second time of transmission. The vessel data messages may be AIS position messages, and the vessel identifiers may be MMSIs.

The vessel traffic data may relate to the movement of each of a plurality of vessels, and may comprise automatic identification system (AIS) messages broadcast by those vessels. Each AIS message contains the location and time at which it was broadcast. The first and second vessel identifiers are thus associated with particular respective times at which the vessel identifier was transmitted, and are each associated with respective positions at which the vessel identifier was transmitted. In some embodiments, the first and/or second vessel identifier is a MMSI of a vessel. The first position may be transmitted in an AIS message, which may contain a latitude and a longitude. The latitude and longitude of a particular AIS message together comprise the position of the vessel. The AIS message may also contain the vessel identifier, for instance the MMSI. Other information that may be included in the AIS message is a vessel's International Maritime Organization (IMO) number, navigation status (e.g. at anchor, under way using engine, etc.), rate of turn (e.g. right or left, 0 to 720 degrees per minute), speed over ground (typically given in knots), location data (e.g. longitude and latitude), position accuracy, course over ground (relative to true north), true heading, data relating to fuel usage (e.g. current amount of fuel, current fuel usage rate), and a time stamp. Typically, AIS messages are automatically broadcast at regular time intervals via a transmitter on the vessel. The time interval is typically of the order of a few seconds.

At step 204, a second position associated with a second vessel identifier is determined. This may be determined in the same way as the first position. In some embodiments, the second position is transmitted in an AIS message and/or the second vessel identifier is a MMSI of a vessel. The first and second vessel identifiers may be the same MMSI. The first position and the second position may be consecutive positions transmitted by the same AIS transmitter.

Whilst position data is generally transmitted by an AIS transceiver on a vessel every few seconds, this degree of granularity is not often required to accurately track a vessel's movement, especially in cases of larger vessels that may only move at a maximum speed of 15 knots, for example. Therefore, only a subset of the available position data need be analysed to ensure correct application of the method 200. In some embodiments, it is considered that analysing position information at frequencies higher than once per hour doesn't add any relevant information, merely increasing the amount of data that is being handled. Therefore, the first and second positions may be determined from messages that are transmitted, for example, an hour apart. In embodiments, the last position message transmitted in each hour of the day is used. Other position messages can be discarded, which improves the efficiency of the method 200. In the case that the method 200 is implemented by a computing device, this may reduce the processing and storage requirements of the method 200.

In other embodiments, the first and second positions may be determined using the Global Positioning System (GPS) or other known geolocation techniques.

At step 206, it is determined if the first vessel identifier and the second vessel identifier are related. This can be achieved in a number of ways. In some embodiments, the first and second vessel identifiers are compared to each other to see if they match. For example, the first and second vessel identifiers may be the same MMSI. In other examples, the first and second vessel identifiers can be analysed to see if they relate to the same vessel. For example, the first and second vessel identifiers may be different MMSIs that are related to the same vessel, for example in the case that a MMSI is changed as the vessel is in transit. In another example, the first vessel identifier may be a MMSI and the second vessel identifier may be an IMO number. It can then be determined if the MMSI and the IMO number relate to the same vessel.

If it is determined that the first vessel identifier and the second vessel identifier are not related, the method 200 ends. The subsequent processing of the data will be explained later. If it is determined that the first vessel identifier and the second vessel identifier are related, a speed that would be required for a vessel to have moved from the first position to the second position is determined at step 208. In some embodiments, this is achieved by determining the distance between the first and second positions and the difference between the times associated with them. This can then be used to determine the speed required to travel from the first position at its associated time to the second position at its associated time, as will be known in the art.

Once the required speed has been determined, it is compared to a speed threshold at step 210. The speed threshold is a maximum speed at which a vessel can realistically travel. If the required speed is determined to be above the threshold, then it can be assumed that the vessel has not actually travelled between the first and second positions. In some embodiments, a default speed of 30 knots is used for the speed threshold. In embodiments the AIS messages, in other words the received vessel information, comprises information identifying the vessel type, dimensions, and/or tonnage. Where the type of vessel at issue is known, and the maximum speed at which that particular vessel can travel is also known, then that maximum speed value can be used. For example, each vessel type may be associated with a known maximum speed, which can be retrieved from a database. For a large tanker, this may be, for example, 15 knots. In this case, the speed threshold will identify more relevant cases than in the default case. This reduces the amount of data that needs to be handled. In embodiments where the maximum speed of the vessel at hand is known, the threshold can be further configured. For example, a threshold of 15% above the maximum speed can be used. The speed threshold can be expressed in any suitable speed measurement dimensions, for example in knots. A threshold of a particular percentage above the 'known' maximum speed may be used in order to account for situations in which the vessel can travel faster than the 'known' value. This may occur in situations, for example, in which the vessel has been modified. Also, the clock value of a particular AIS message, i.e. the timestamp which represents the time at which the message was broadcast, may contain small deviations or errors of perhaps a few seconds. Accordingly, a particular percentage above the maximum speed value, for example 15% above the maximum value, is used as the speed threshold to account for and allow for these situations.

If it is determined that the speed is below the speed threshold, the positions are deemed to be within a distance that allows the vessel to have travelled between them at a sensible speed. As it has already been determined that the positions relate to the same vessel identifier at step 206, it can be assumed that the positions relate to the same vessel going along its route. The first position is then associated with the second position, at step 212. In some embodiments, this comprises allocating the first and second positions to a common vessel track, such as the first and second vessel tracks 102, 104. In some instances, the first position may already be part of an existing vessel track. The existing vessel track could have one or more positions already associated to it, including the first position. In this case, the second position can be allocated to this existing vessel track, to continue building a picture of where the vessel is travelling.

The case where the speed exactly meets the threshold could be applied to either of the above cases, as will be envisaged.

A method is therefore provided that processes position data, such as that received in AIS messages, and accurately updates vessel positions, even in the instance that a vessel identifier is changed as the vessel moves. Existing methods are ineffective as they are not able to properly and/or efficiently process vessel location data if the data contains position information associated with related or identical vessel identifiers which were in fact broadcast by different vessels. It will be appreciated that prior methods were therefore forced to handle and store excessive amounts of useless data. The provision of an automatic method of processing associating the first position with the second position The method 200 can be performed in real time, as vessels are travelling, or can be performed as a post-processing step using stored data. For example, details of the vessel positions and identifiers can be stored, for example in a database. This allows the positions and vessel identifiers to be analysed at a later time.

As discussed above, when one of the conditions at step 206 or step 210 is not met, the positions are not associated. However, the data that has been processed can still be useful.

Figure 3:
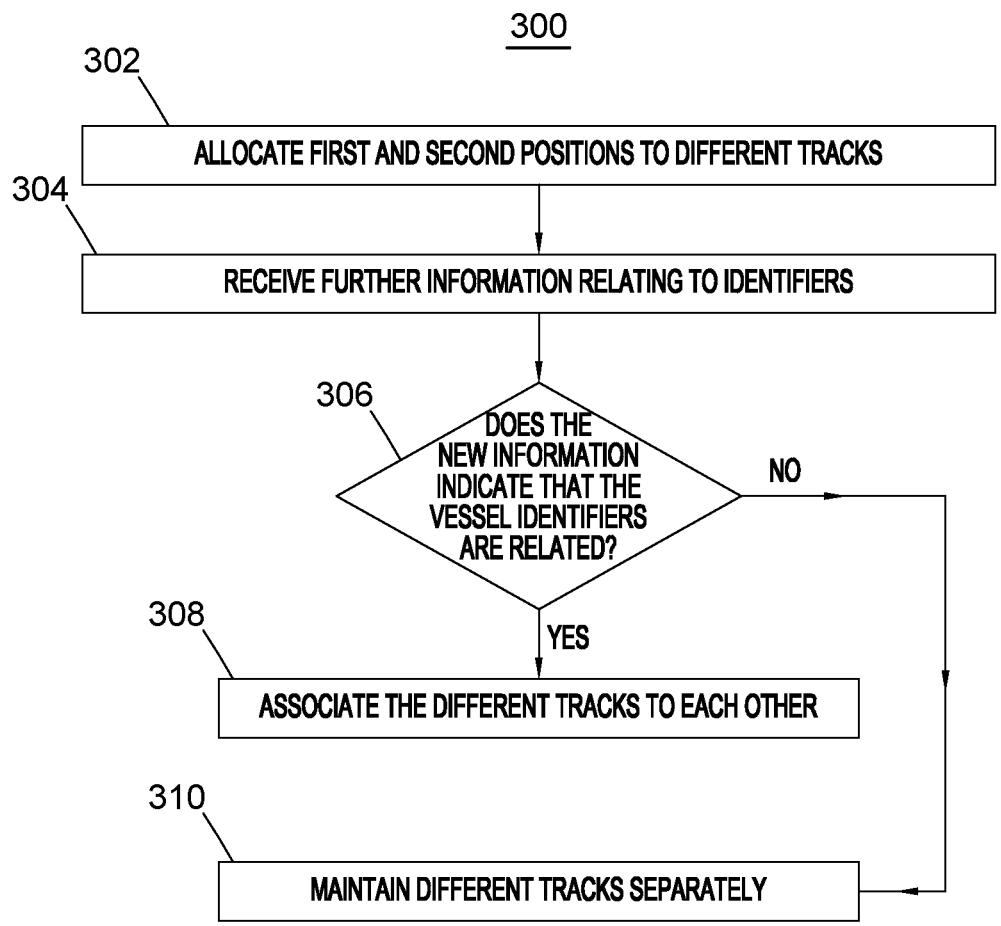
FIG. 3 shows a method of managing vessel tracks, according to embodiments of the disclosure.

FIG. 3 shows a method 300 of processing the data in the case that the vessel identifiers are not found to be related at step 206 or the speed is found to be above the threshold at step 210. For example, the first and second vessel identifiers may be different MMSIs, and only the first MMSI is associated to a vessel. The second MMSI therefore cannot be deemed to be related to the first, and so the positions cannot be allocated to the same track. Alternatively, the positions may be so far apart that no vessel could possibly make the distance in the given time. In these cases, the first and second positions are allocated to different vessel tracks at step 302. In some embodiments, two new vessel tracks are created and one of the positions is assigned to each. In other embodiments, each position is added to a separate existing track. Alternatively, if one of the positions is already allocated to an existing vessel track, one new vessel track can be created to which the other position is allocated. In the case that one new vessel track is created, then the previously existing track is still considered as the "dominant" track, as it has the last known valid position for the vessel. A new track with no history cannot be considered as dominant, unless all previous tracks are inactive, as will be discussed below.

Whether the method 200 is performed in real time, or as a post processing process, the step 206 of determining if the first and second vessel identifiers are related can only be performed based on information that is currently available. However, in the case that the identifiers are found not to be related at step 206, information that is made available later may indicate that the first and second vessel identifier are indeed related. At step 304, further information relating to the vessel identifiers is received. This could be in the form of an information message in the AIS system (discussed later), or a message from a port authority, for example. At step 306, it is determined if the new information indicates that the first and second vessel identifiers are related. If they are, the separate vessel tracks are associated with each other at step 308. The tracks can be combined into a single vessel track. In some embodiments, the two tracks are associated, and the latest tracked is designated as an "active" track, whilst the older track is designated as an "inactive" track. The concept of active and inactive tracks will be explained in more detail below. If the new information does not indicate that the first and second vessel identifiers are related, the tracks are maintained separately at step 310.

In some instances, position information may be received that meets the conditions at step 206 or 210 but is clearly not relevant for addition to a vessel track. As discussed above, transmissions could be distorted by a number of factors, such as overlapping radio frequencies with other transmissions from other types of transport such as taxis, or airplanes at nearby airports. In such instances, a determination can be made as to whether the first and/or second position are at an in-land location. If one of the positions is in-land, it is discarded and the determinations at steps 206 to 210 of method 200 need not be performed. In a preferred embodiment, this is performed before the identifiers or required speed are analysed, between steps 204 and 206. In this way, any instances where one or more of the position is at an in-land location can be discounted before any identifier or speed processing is performed.

One consequence of the ease at which MMSIs can be changed, and the number of disparate positions that can be associated with a single MMSI, is that multiple vessel tracks may be in existence for a single MMSI. It has been known to see examples of more than 20 concurrently existing tracks for a single MMSI. Therefore, methods are needed to handle the multiple tracks that exist and ensure that tracks are allocated to the correct vessel.

As discussed above, positions may be allocated to existing tracks, and/or new tracks may be created. However, in some instances, tracks may exist that have not been updated for a significant period of time. In these cases, the tracks can be assumed to have finished and need not be maintained. For example, if a track has not been updated for a month, it is unlikely that a new position nearby is a valid position for the vessel that was on that track. Therefore, vessel tracks are constantly monitored to see when they were last updated. In some embodiments, tracks can be designated as "active" or "inactive". An active track is one that is ongoing and could still be added to. An "inactive" track is one that is no longer considered relevant and cannot have new positions added to it. One criteria that can be used to distinguish between the two is the time at which the last position was allocated to a track. Tracks may be considered active by default and if the last position allocated to a track was allocated before a threshold time, the vessel track is deactivated. The threshold time may be, for example, three days. In this way, positions cannot be allocated to out-of-date tracks. This allows tracks that are no longer considered relevant to be discarded, and therefore the amount of data to be stored is reduced. Furthermore, processing required to allocate positions to existing tracks is reduced as the number of possible active tracks is reduced. Alternatively, tracks where the last position was allocated before the threshold time can be kept active, and the last position is not retrieved when a new position is found for the track. If a dominant track is rendered inactive by the threshold time being passed, then it loses its dominant status. If another track exists for that vessel, it can take over as the dominant track. If no other track exists, a new track can be created which becomes the dominant track.

Even once the inactive tracks are identified and discarded, multiple active tracks may still exist for a given MMSI. In such instances, it may not be immediately apparent to which track a received position for that MMSI should be allocated. In some embodiments, the position in question can be added to the closest active track associated with its MMSI. However, it will be appreciated that only one track of the multiple active for a given MMSI actually belongs to the vessel in question. In most cases, each active track for a given MMSI relates to a different vessel and has been assigned the incorrect MMSI either erroneously or as a disguise, as discussed above. To improve data handling and ensure tracks are maintained correctly, correct track should be identified and designated as such.

To do this, the positions and/or tracks can be associated to an actual vessel. This can be done using the vessel identifiers. As discussed above, in the example of a MMSI, a vessel may transmit messages identified by a given MMSI, but the MMSI can change over time, and so the particular vessel transmitting the MMSI may not be known by a message recipient. In some embodiments, the message recipient may have a store of MMSI-IMO number pairs and use the stored pairs to associate the MMSI in a received message to a particular IMO number relating to a particular maritime vessel. In some embodiments, information on MMSI-IMO number pairs can be received from information messages in the AIS system or can be received in messages from a port authority. In some instances, an IMO number may be associated with a MMSI using stored pairs, and this association may be later verified using information received from a port authority. In this way, a position and/or track can be associated to the particular vessel to which it relates.

Once a position or track is confirmed as relating to a particular vessel, it is indicated as being "valid", and other positions or tracks for the same MMSI are indicated as being "invalid". Once a track is considered valid, it stays valid until conflicting information is received. Any positions which are a logical continuation of the valid track are allocated to it, and are immediately deemed valid with no further need for further validation.

In some cases, there may be no information relating to which IMO a MMSI relates. In this case, a track may still be constructed, but is not associated with a vessel until the relevant information is received to do so. Similarly, if information is received later that indicates that a MMSI-IMO number pair that has been used is incorrect, that pair may be unverified, and the correct pair used as appropriate.

Invalid tracks may still be considered active, as long as the last position for the track was received within the threshold time mentioned above. However, invalid tracks should not be discarded, as the information used to build them came from a vessel, albeit a vessel that was transmitting the wrong MMSI. In some instances, that vessel is subsequently identified and the track can be associated to it. For example, subsequently received AIS information messages, or port authority information, may indicate that the vessel was transmitting from a position on the invalid track at the time associated with that position. An updated MMSI may also be provided, which is the MMSI that the vessel should have been transmitting. This vessel can then be associated with the invalid track. The track then becomes valid and the MMSI can be updated to the correct MMSI. By maintaining invalid tracks while they are still active, a corrected history can be provided for a vessel's movements, rather than just ensuring that the vessel is tracked properly going forward.

As discussed above, the most frequently broadcast AIS message is a position report which contains dynamic information about the vessel, for example its current location, its speed over ground, its bearing, rate of turn, and so on. These messages each include the vessel identifier, for example the MMSI number. These position report messages are broadcast with an interval of typically a few seconds, depending on the class of transponder the vessel is using. Another possible AIS message, which is typically broadcast less frequently, contains a greater amount of static and/or voyage related information. These messages can be called information messages, and they typically contain information such as the ship name, type, dimensions, destination, eta, cargo type, and so on. These messages also include the MMSI and the IMO number. These messages are broadcast typically on the order of every few minutes. Therefore, a scenario may occur when a number of positions with vessel identifiers are received, but no IMO can as yet be assigned to these positions or vessel identifiers. This may happen more often when, for example, the database which holds information about the tracks and the relationships between IMOs and MMSIs is based on a subset of all the received messages, rather than all received messages.

In such scenarios, the positions are allocated to different tracks at 302 until, at step 304, further information in the form of an information message is received. At this point, it is then possible to determine at step 306 whether the new information, i.e. the information message, indicates that the first and second vessel identifiers are related, and the positions and tracks can be either associated to one another or maintained separately based on the new information.

For example, a first position report message may be received comprising a first vessel identifier associated with a first position, and a second position report message may be received comprising a second vessel identifier associated with a second position. While the first position report message has an associated IMO according to the database, the second position report does not.

A number of scenarios may arise. In a first example, the first vessel identifier is a first MMSI with an associated first IMO. The associated first IMO is obtained either via receipt of a vessel information message containing both the first MMSI and the first IMO, or by consulting a database which holds information regarding associated MMSIs and IMOs. The second vessel identifier is a second MMSI, but no associated IMO is available. In other words, the second IMO value is 'zero'. Different tracks are created at step 302. At step 304, further information such as a new information message is received. The information message may indicate that the second IMO is equal to the first IMO, and thus the new information message may indicate that the vessel identifiers are related. In this instance, the two different tracks created at step 302 are assigned to each other, in other words joined together. Alternatively, the new information message may indicate that the first IMO is not equal to the second IMO. In this instance, separate tracks are maintained. The database is updated to indicate that either the vessel identifiers are related, or that they are not related.

Additional examples relate to functionality which may occur when a track does not have an IMO value associated with it. In this scenario, the database may be regularly queried to determine whether new information has been received which will allow an IMO to be assigned to the track. If new information has been received, the tracks are updated according to the methods disclosed herein. For example, it may be that, by querying the database, it is discovered that an IMO has been found which is related to the MMSI of a track which previously had an unknown IMO. As a result, this track may be joined with another track having the same IMO, or may be maintained as a separate track if no other currently existing track has a related IMO.

In relation to the above described examples, there may also be a time threshold associated with querying the database. For example, if no new relevant information has been received after three days of regularly querying the database in order to attempt to assign an IMO to a track, further database queries may be halted, and the track may be permanently listed as a separate track. The time threshold need not be 3 days, it may be any time period, for example on the order of hours, days, or even weeks. The application of a time threshold reduces demands on processors implementing the method, as otherwise the database would continue to be regularly queried.

Additional functionality may arise when a ship's captain changes a vessel's MMSI. Timestamps from messages may be associated with the time at which the message was received, rather than the time at which the message was actually transmitted from the vessel. Due to a range of factors, this may mean the times associated with messages transmitted from the vessel may not be indicative of the times they were actually broadcast from the vessel. In some scenarios, the ordering of the messages can be reversed. This may depend on a number of factors, for example the relative positions of receiving satellites, land-based receiving stations, and the vessel. Accordingly, when a vessel changes its MMSI, this may result in a period of time in which there are conflicting messages relating to the relationship between the IMO of the vessel (which has not changed) and the MMSI of the vessel (which has changed). In a certain time period, a first set of messages can be received indicating that the vessel has a first MMSI, and another set of messages are received which overlap in time with receipt of the first set of messages. This second set of messages indicate that the vessel has a second, different MMSI.

In accordance with methods of the present disclosure, the frequency of such messages are taken into account when assigning IMOs to particular tracks or updating the IMOs of particular tracks. In certain examples, whenever a relationship between a particular IMO and a particular MMSI is to be updated in the database, the previously received information messages are reviewed. If a frequency of messages indicating that the IMO is related to a first MMSI is greater than a frequency of messages indicating that the IMO is related to a second MMSI, then the system will record (or maintain, as the case may be) that the IMO is associated with the first MMSI. Accordingly, the frequency of messages is taken into account when updating the database. This functionality means that the MMSI values in the database are not constantly changing and being overwritten/re-written in a time period during which potentially conflicting information messages are received.

To further improve the efficiency of storage of the methods disclosed above, only one full position message may be stored per track, with previous messages being discarded. That is, the position information needed for the track is maintained, but any other information contained in an AIS message that is not needed for the track (for example, the orientation, course, and/or speed of the vessel) may be discarded. This ensures that the storage requirement for each track are reduced.

Figure 4:
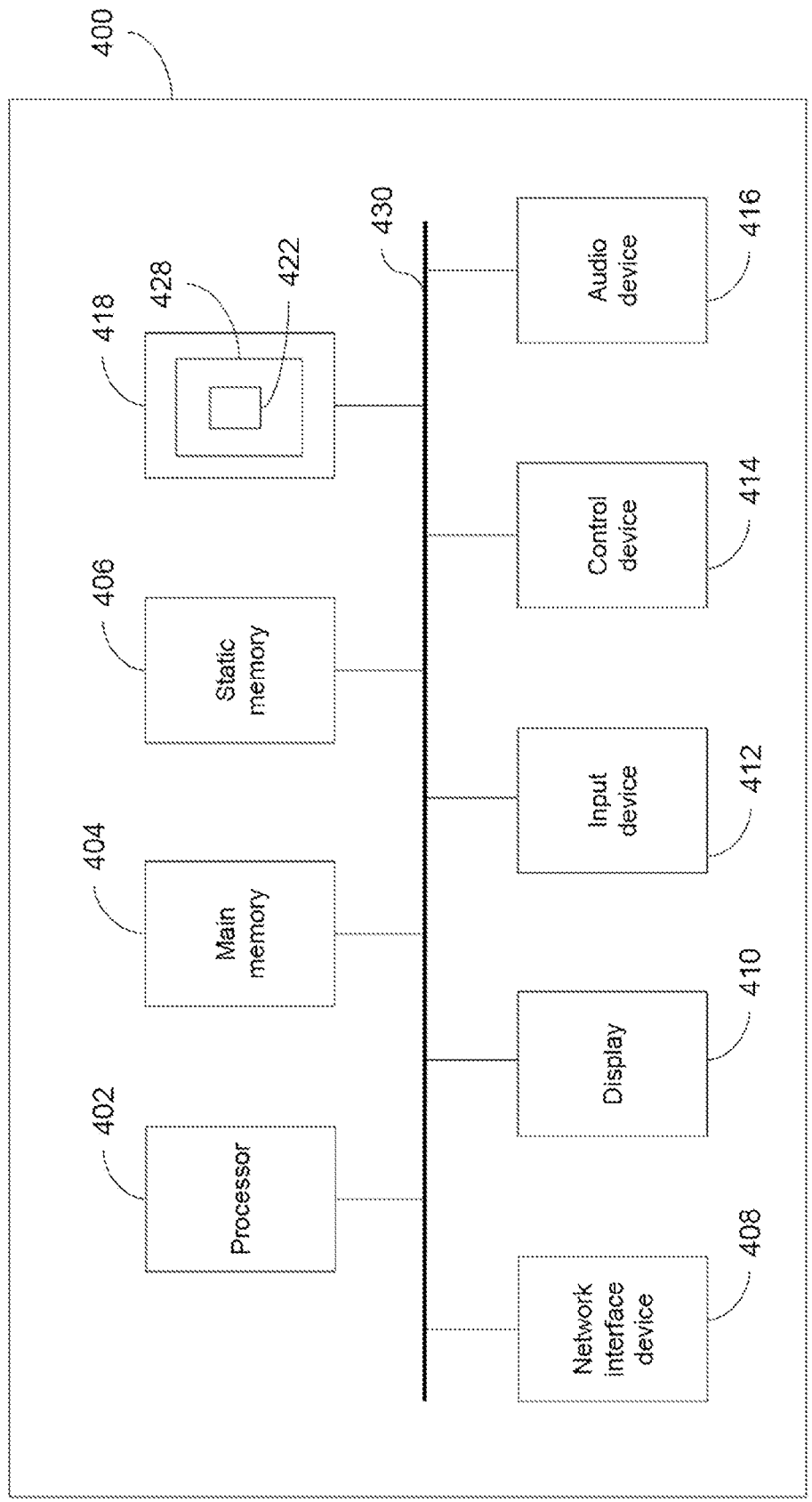
FIG. 4 shows a computing device capable of performing the disclosed methods.

The methods discussed above can be performed on a computing device located, for example, on a vessel or on land. FIG. 4 illustrates a block diagram of one implementation of a computing device 400 within which a set of instructions, for causing the computing device to perform any one or more of the methodologies discussed herein, may be executed. In alternative implementations, the computing device may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory (e.g., a data storage device 418), which communicate with each other via a bus 430.

Processing device 402 represents one or more general-purpose processors such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. Processing device 402 is configured to execute the processing logic (instructions 422) for performing the operations and steps discussed herein.

The computing device 400 may further include a network interface device 408. The computing device 400 also may include a video display unit 410 (e.g., a liquid crystal display (LCD) or a cathode ray tube (CRT)), an alphanumeric input device 412 (e.g., a keyboard or touchscreen), a cursor control device 414 (e.g., a mouse or touchscreen), and an audio device 416 (e.g., a speaker).

The data storage device 418 may include one or more machine-readable storage media (or more specifically one or more non-transitory computer-readable storage media) 428 on which is stored one or more sets of instructions 422 embodying any one or more of the methodologies or functions described herein. The instructions 422 may also reside, completely or at least partially, within the main memory 404 and/or within the processing device 402 during execution thereof by the computer system 400, the main memory 404 and the processing device 402 also constituting computer-readable storage media.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as "receiving", "determining", "comparing", "enabling", "maintaining", "identifying", "associating", "allocating" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed methods of tracking vessel movement are useful for a range of organisations for a variety of purposes. For example, the disclosed methods are particularly useful for port authorities and harbour masters to help avoid collisions and to control vessel traffic with greater efficiency. The disclosed methods are also useful for coast guard organisations to facilitate search and rescue efforts. As discussed earlier, a vessel owner can change the MMSI intentionally. The disclosed methods clarify situations in which two different vessels are broadcasting identical MMSI numbers and therefore the disclosed methods may be used by law enforcement and border control agencies to identify, monitor and mitigate unlawful activity.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A computer-implemented method of tracking vessel movement, the method comprising:
receiving, in electronic form, a first vessel data message comprising a first vessel identifier, the first vessel data message having been transmitted at a first time and being associated with a first position;
receiving, in electronic form, a second vessel data message comprising a second vessel identifier, the second vessel data message having been transmitted at a second time and being associated with a second position;

determining if the first vessel identifier matches the second vessel identifier;

if the first vessel identifier matches the second vessel identifier, determining a speed required for a vessel to have moved from the first position to the second position;

determining if the speed is below a speed threshold;

if the speed is below the speed threshold, associating the first position and the second position with a first vessel; or if the speed is above the speed threshold, associating the first vessel identifier with the first vessel and associating the second vessel identifier with a second vessel;

updating and sorting positions of at least one of the first vessel and the second vessel based on whether the first and second vessel identifiers match and on the determined speed being below or above the speed threshold; and associating each of the first and second positions with a correct vessel track based on the determined speed being below or above the speed threshold.

2. The computer-implemented method of claim 1, wherein the first vessel identifier and the second vessel identifier are the same.

3. The computer-implemented method of claim 1, wherein determining if the first vessel identifier matches the second vessel identifier comprises determining if they relate to the same vessel.

4. The computer-implemented method of claim 1, further comprising, if the first vessel identifier does not match the second vessel identifier, allocating the first and second positions to respective first and second vessel tracks.

5. The computer-implemented method of claim 4, further comprising:

subsequently determining that the first vessel identifier matches the second vessel identifier; and combining the first and second vessel tracks into a single vessel track.

6. The computer-implemented method of claim 4, further comprising:

determining if the last position allocated to the first vessel track was allocated before a threshold time; and when the last position allocated to the first vessel track was allocated before threshold time, deactivating the first vessel track.

7. The computer-implemented method of claim 1, wherein the first and/or second vessel identifier comprises a maritime mobile service identity (MMSI).

8. The computer-implemented method of claim 1, further comprising associating the first and/or second vessel identifier with a respective first and/or second vessel.

9. The computer-implemented method of claim 1, further comprising associating the first and/or second vessel identifier with a respective international maritime organisation (IMO) number.

10. The computer-implemented method of claim 9, wherein associating the first and/or second vessel identifier with a respective IMO number is performed based on information received form a port authority.

11. The computer-implemented method of claim 9, wherein associating the first and/or second vessel identifier with a respective IMO number is performed based on a set of stored identifier-IMO pairs.

12. The computer-implemented method of claim 1, wherein determining the first and/or second position comprises receiving an automatic identification system (AIS) message comprising position information.

13. The computer-implemented method of claim 12, wherein the AIS message comprises a respective vessel identifier.

14. The computer-implemented method of claim 1, further comprising:

determining if the first and/or second position is in-land;

determining if the first vessel identifier matches the second vessel identifier only if neither position is determined to be in-land; and if either position is determined to be in-land, not associating the first position and the second position with the first vessel.

15. The computer-implemented method of claim 1, wherein the first position and the second position are consecutive positions.

16. A non-transitory computer readable medium comprising computer-executable instructions which, when executed by a processor, cause the processor to perform a method of tracking vessel movement, the method comprising:

receiving a first automatic identification system (AIS) position report comprising a first vessel identifier, the first AIS position report having been transmitted at a first time and being associated with a first position;

receiving a second AIS position report comprising a second vessel identifier, the second AIS position report having been transmitted at a second time and being associated with a second position;

determining if the first vessel identifier matches the second vessel identifier;

if the first vessel identifier matches the second vessel identifier, determining a speed required for a vessel to have moved from the first position to the second position;

determining if the speed is below a speed threshold;

if the speed is below the speed threshold, associating the first position and the second position with a first vessel; or if the speed is not below the speed threshold, determining that the first vessel identifier belongs to the first vessel and the second vessel identifier belongs to a second vessel;

updating and sorting positions of at least one of the first vessel and the second vessel based on whether the first and second vessel identifiers match and on whether the speed is below the speed threshold; and associating each of the first and second positions with a correct vessel track based on whether the determined speed is below the speed threshold.

17. A computer-implemented method of tracking vessel movement, the method comprising:

receiving, via a computing device, a first vessel data message comprising a first vessel identifier, the first vessel data message having been transmitted at a first time and being associated with a first position;

receiving a second vessel data message comprising a second vessel identifier, the second vessel data message having been transmitted at a second time and being associated with a second position;

determining, via the computing device, that the first vessel identifier matches the second vessel identifier;

determining, via the computing device, a speed required for a vessel to have moved from the first position to the second position;

associating, via the computing device, the first position and the second-position with a first vessel when the determined speed is below a speed threshold; and updating and sorting positions of at least one of the first vessel and a second vessel based on whether the first and second vessel identifiers match and on the determined speed being below or above the speed threshold; and associating each of the first and second positions with a correct vessel track based on the determined speed being below or above the speed threshold.

\* \* \* \* \*